United States Patent [19]

Mitsutake et al.

[11] Patent Number: 5,371,617

[45] Date of Patent: Dec. 6, 1994

[54] LIQUID CRYSTAL PROJECTOR WITH ONE MODULATOR INCLUDING A MEMBER FOR PREVENTING LIGHT FROM ANOTHER MODULATOR FROM ENTERING THE ONE

[75] Inventors: Hideaki Mitsutake, Tokyo; Katsumi Kurematsu, Kawasaki, both of Japan

[73] Assignee: Canon Kabushiki Kaisha, Tokyo, Japan

[21] Appl. No.: 959,718

[22] Filed: Oct. 13, 1992

[30] Foreign Application Priority Data

Oct. 15, 1991 [JP] Japan ................... 3-293909
Jan. 7, 1992 [JP] Japan ................... 4-000801

[51] Int. Cl.$^5$ ............... G02F 1/1335; G02F 1/133
[52] U.S. Cl. .............................. 359/40; 359/41; 359/53; 359/67
[58] Field of Search ............... 359/40, 41, 53, 67

[56] References Cited

U.S. PATENT DOCUMENTS

| | | | |
|---|---|---|---|
| 4,729,640 | 3/1988 | Sakata | 350/348 |
| 4,904,061 | 2/1990 | Aruga | 359/40 |
| 5,028,121 | 7/1991 | Baur et al. | 359/41 |
| 5,105,289 | 4/1992 | Sonehara et al. | 359/40 |
| 5,144,462 | 9/1992 | Otsuka et al. | 359/41 |
| 5,235,446 | 8/1993 | Majima | 359/53 |
| 5,237,435 | 8/1993 | Kurematsu et al. | 359/53 |

FOREIGN PATENT DOCUMENTS

| | | | |
|---|---|---|---|
| 0209112 | 1/1987 | European Pat. Off. | |
| 63-104016 | 5/1988 | Japan | 359/40 |
| 4-057011 | 2/1992 | Japan | 359/40 |
| 4-113309 | 4/1992 | Japan | 359/40 |

OTHER PUBLICATIONS

Patent Abstracts of Japan, vol. 015, No. 220 (May 6, 1991), Abstract of JP 3-063628 (Mar. 19, 1991).
Patent Abstracts of Japan, vol. 015, No. 372 (Sep. 19, 1991), Abstract of JP 3-146942 (Jun. 21, 1991).
Patent Abstracts of Japan, vol. 012, No. 476 (Dec. 13, 1988), Abstract of JP 63-196192 (Aug. 15, 1988).

*Primary Examiner*—Anita Pellman Gross
*Attorney, Agent, or Firm*—Morgan & Finnegan

[57] ABSTRACT

A display apparatus using liquid crystal devices especially having a scattering mode and a projector in the display apparatus using the liquid crystal devices. The projector includes: an illuminating means for supplying illumination light; first and second modulating means for forming rays of image light by modulating the illumination light from the illuminating means; and a projecting means for projecting the rays of image light formed by the first and second modulating means. In this projector, a member for absorbing or reflecting the light traveling towards the second modulating means through the first modulating means is provides on at least any one of the light incident side and the light outgoing side of the second modulating means.

23 Claims, 8 Drawing Sheets

LIQUID CRYSTAL PROJECTOR WITH ONE MODULATOR INCLUDING A MEMBER FOR PREVENTING LIGHT FROM ANOTHER MODULATOR FROM ENTERING THE ONE

BACKGROUND OF THE INVENTION

1. Field of the Invention

The present invention relates to a display apparatus using liquid crystal display devices and, more particularly, to a display apparatus employing the liquid crystal devices and a projector having a scattering mode.

2. Related Background Art

Figure 1:
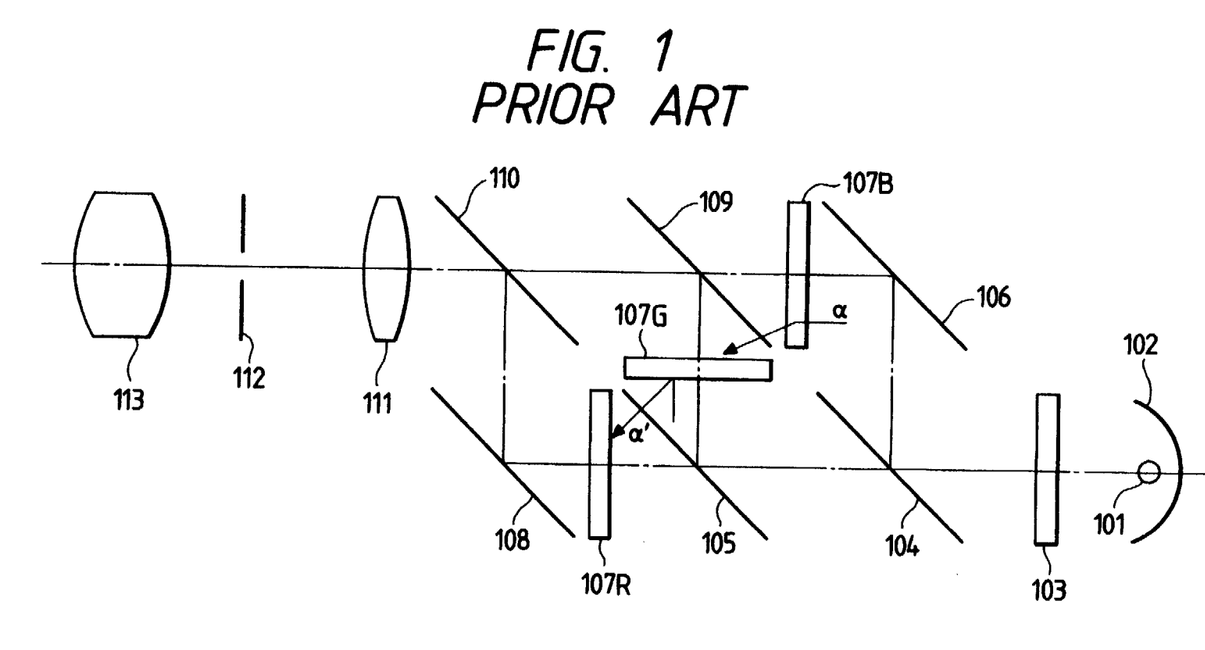
FIG. 1 is a view illustrating a constitution of a conventional projector.

A white light beam emitted from a light source 101 consisting of a halogen lamp, a metal halide lamp or the like, is reflected by a reflector 102 which assumes a rotational parabolic configuration having a focal point at the position of the light source 101. The parallel light beam passes through a filter 103 for blocking infrared rays and ultraviolet rays and thereafter is resolved into three color components—red, green and blue—by means of a color resolving optical system. The optical system consists of a dichroic mirror 104 which reflects the blue color but transmits the red and green colors, a dichromic mirror 105 which reflects the green color but transmits the red color and a total reflection mirror 106. The thus resolved luminous fluxes are incident on liquid crystal devices 107R, 107G or 107B corresponding to the respective color.

The liquid crystal devices 107R, 107G, 107B are each split into a plurality of pixels arranged in a matrix. The pixels are respectively independently driven by electric signals corresponding to the contents of a display and are scattered or become transparent with respect to incident light beams.

The light beams which have passed through the respective liquid crystal devices 107R, 107G, 107B become again the synthetic light beams as they pass through a color synthetic optical system consisting of a total reflection mirror 108, a dichroic mirror 109 which reflects the green color but transmits the blue color and a dichroic mirror 110 which reflects the red color but transmits the green and blue colors. Thereafter, the synthetic light beams pass through a Schlieren lens 111 and reaches a shield plate 112 having an aperture, the center of which is the optical axis. When passing through herein the pixels are kept in the transparent state in each pixel of the liquid crystal devices. In addition, outgoing light beams from the respective liquid crystal devices 107R, 107G, 107B travel through the aperture part of the shield plate 112 and are projected on an unillustrated screen by means of a projection lens 113. On the other hand, the outgoing light beams from the liquid crystal devices 107R, 107G, 107B after passing through the pixels kept in the scattered state are shielded by the shielding, art of the shield plate 112. The outgoing luminous fluxes do not reach the projection lens 113 and are not therefore projected on the unillustrated screen. An image can be displayed by selecting either the scattered condition or the transmitted condition.

Figure 2:
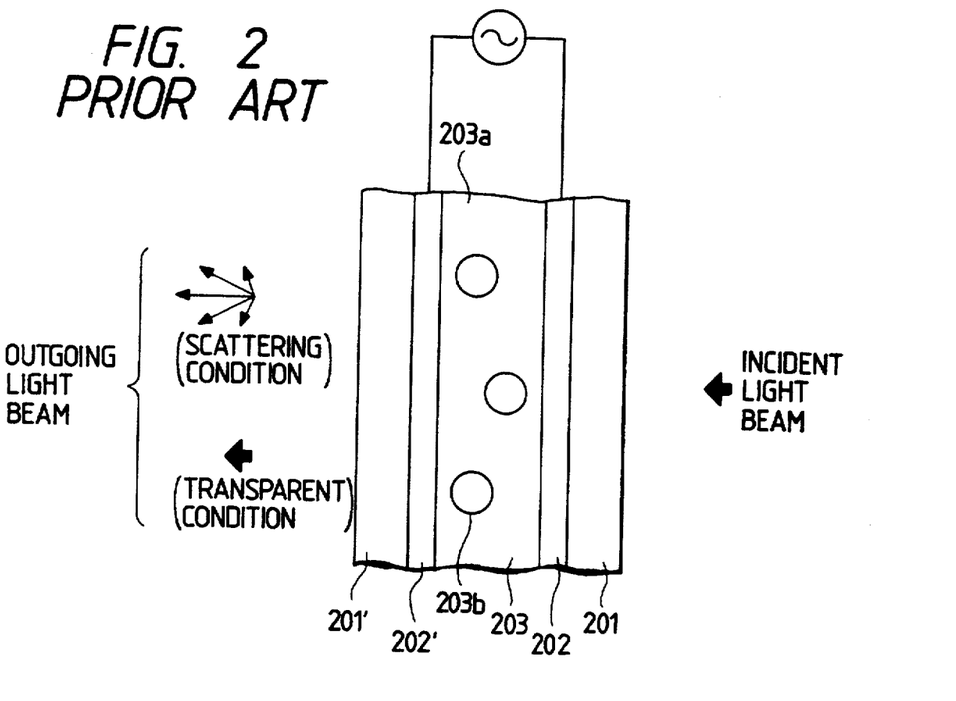
FIG. 2 is a view depicting a constitution of a liquid crystal device employed in the apparatus of FIG. 1.

FIG. 2 is a sectional view illustrating an example of the liquid crystal device employed for a projection in the conventional example shown in FIG. 1. A layer 203 is interposed between transparent glass substrates 201 and 201' disposed at a constant interval. Injected into the layer 203 are a macromolecule medium 203a and droplets 203b composed of positive dielectric anisotropic liquid crystal molecules diffused in the macromolecule medium 203a. Transparent electrodes 202, 202' are disposed adjacently on inner surfaces, confronting each other, of the glass substrates 201 and 201'. Materials of the macromolecule medium and the liquid crystal molecules are selected so that a refractive index of the macromolecule medium 203a is equal to a normal refractive index of the liquid crystal molecule. Exemplified is a method of forming the layer 203, the method involving the steps of: injecting a mixture of pre-polymerization monomer molecules and liquid crystal molecules between the glass substrates 201 and 201'; utilizing a property to cause a divergence from the liquid crystal when the monomer molecules are polymerized to become the macromolecules due to action of the heat or light; and thus forming the droplets composed of the liquid crystal molecules.

In the liquid crystal devices of FIG. 2, if no voltage is applied between the transparent electrodes 202 and 202', the liquid crystal molecules within the droplets 203b are oriented at random. Hence, the mean refractive index of the droplets 203b does not coincide with the refractive index of the macromolecule medium 203a, whereby the incident light on the liquid crystal molecules is scattered. Whereas if the voltage is applied, molecular major axes of the Liquid crystal molecules having the positive dielectric anisotropy are aligned in the perpendicular direction to the transparent electrode surfaces 202 and 202'. Therefore, the refractive indices thereof in the direction parallel to the layer consisting of the liquid crystal molecules and the macromolecule medium are coincident with each other. Hence, the incident light on the liquid crystal device, which has electric field vectors directed within the above-mentioned layer, travels straight without being scattered.

As a similar scattering type liquid crystal device, there may be exemplified one in which a low molecule liquid crystal is diffused at random in a network consisting of a macromolecule medium and one which uses a dynamic scattering mode (DS mode).

However, as indicated by a ray α in FIG. 1, among light beams scattered by some pixels, the ray having a large scattering angle incidents again on the other liquid crystal device 107G before being processed by the shield plate 112. Such a ray is partially re-scattered by the liquid crystal device undergoing the re-incidence and passes through the aperture part of the shield plate 112. The ray is projected as a ghost image or flare rays on the screen, resulting in a deterioration of the picture quality.

As described above, the apparatus where the plurality of liquid crystal devices shown in FIG. 1 has a problem in that the scattered light is insufficiently processed.

Figure 3:
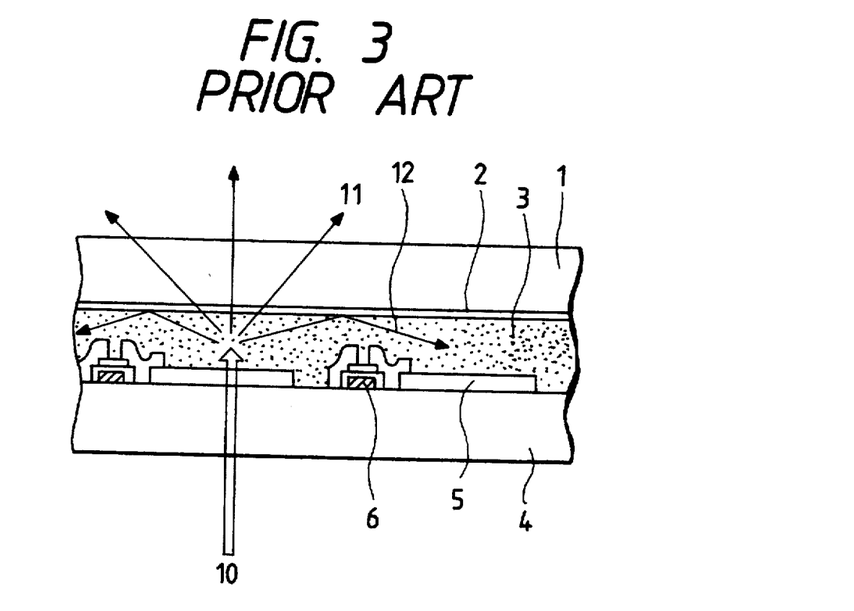
FIG. 3 is a sectional view illustrating a conventional scattering mode liquid crystal device of a matrix display type.

On the other hand, FIG. 3 is a sectional view illustrating the principal portion of a device for selecting either a scattered or non-scattered state in matix in the liquid crystal device shown in FIG. 2. The numeral 5 herein denotes a pixel electrode, and 6 represents a TFT element and a signal line. As depicted in the FIG., if incident light 10 is scattered by a liquid crystal layer 3, a part of the scattered rays enter adjacent pixels as indicated by arrows 12. This phenomenon is called an inter-pixel flare. A problem often arises in that the contrast of a projection image declines due to bleedings which have hitherto been produced by this flare.

In connection with the two problems described above, there exists a possibility in which the same situation may happen in all the display apparatuses using a mode for deflecting the light traveling direction (which hereinafter is defined as a "deflection mode") as in the case of an apparatus formed with a diffraction grating using the liquid crystal without being limited to the scattering mode liquid crystal.

SUMMARY OF THE INVENTION

It is a primary object of the present invention, which has been devised in view of the problems in the prior art described above, to provide a display apparatus using light valves of liquid crystal devices having a deflection mode such as a scattering mode, a diffraction mode and so on, the apparatus being capable of displaying an high-quality image without causing flare rays and ghost rays.

To this end, according to one aspect of the present invention, there is provided a projector of this invention comprising: an illuminating means for supplying illumination light; first and second modulating means for forming rays of image light by modulating the illumination light from the illuminating means; and a projecting means for projecting the rays of image light formed by the first and second modulating means, characterized in that a member for absorbing or reflecting the traveling light towards the second modulating means via the first modulating means is disposed on at least one of the light incident side and the light outgoing side of the second modulating means.

Further, a display device according to the present invention is a liquid crystal display device, having a deflection mode, for performing matrix display. The display device is characterized in that partitions exhibiting a property to reflect or absorb the light are interposed between respective pixels within the liquid crystal layer.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENTS

Figure 4:
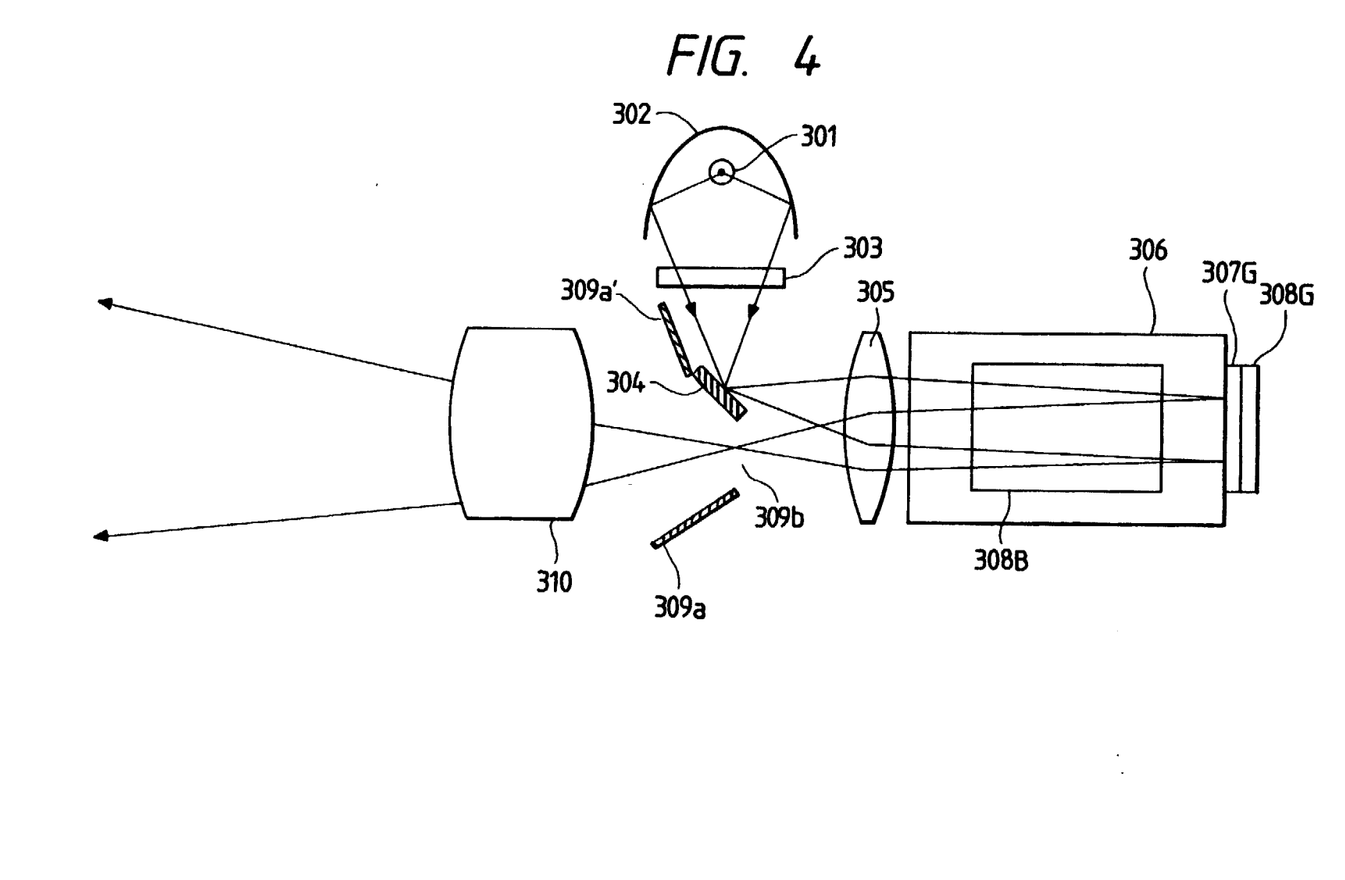
FIG. 4 is a view showing a constitution of an embodiment of the present invention.

FIG. 4 is a whole block diagram which demonstrates an embodiment of a projector according to the present invention.

A light beam emitted from a light source 301 is reflected by a reflector 302 forming a configuration as to be a part of rotational elliptical body in which one of focal points coincides with the light source 301. The reflected light beam pass through a filter 303 for cutting the infrared rays and ultraviolet rays and are condensed onto a reflection mirror 304. The light beam is then directed to a Schlieren lens 305.

The light beam is further resolved into three colors, red, green and blue through dichroic mirrors 306 intersecting crosswise. The luminous fluxes are thereafter modulated and reflected by the liquid crystal devices (308G, 308B and so on) provided according to the respective colors and again synthesized by the dichroic mirrors 306. Thus, the dichroic mirrors 306 serve as both a color resolving optical system and a color synthesizing optical system as well. The image light synthesized by the dichroic mirrors 306 is further condensed at an aperture part 309b defined by shield plates 309a and 309a' through the Schlieren lens 305. The image light is projected to form an image on the unillustrated screen by means of a projection lens 310.

Figure 5:
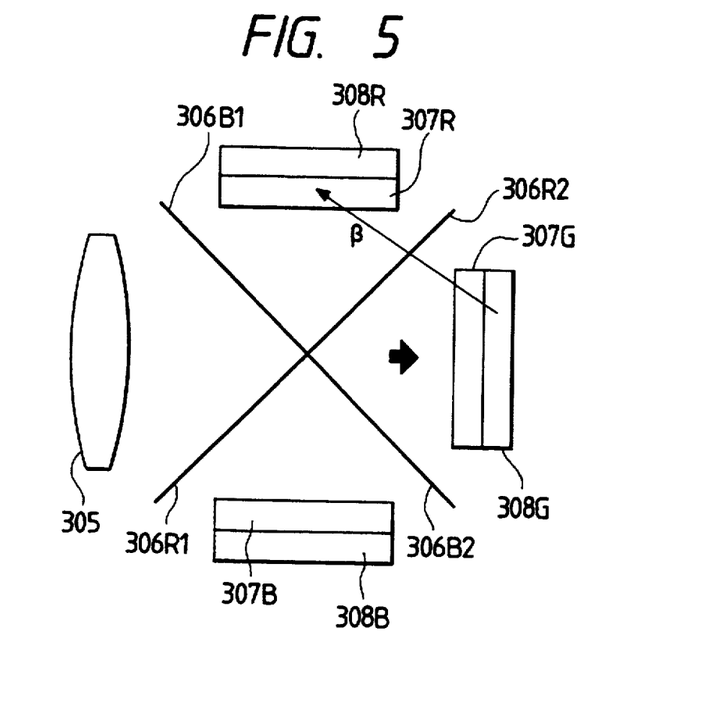
FIG. 5 is a top view showing dichroic mirrors 306 and peripheral portions thereof FIG. 4.

FIG. 5 is an illustration wherein the dichroic mirrors 306 shown in FIG. 4 and peripheral portions thereof are viewed from above. Among the light beams which pass through the Schlieren lens 305, the red luminous fluxes reflected by dichroic mirrors 306R1 and 306R2 which reflects only the red color entering the dichroic mirrors 306 pass through a filter 307R which transmits the red color but absorbs the green and blue colors. Thereafter, the red light beam is incidented on the liquid crystal device 308R for the red color. Similarly, the blue light beam reflected by the dichroic mirrors 306B1 and 306B2 which reflect only the blue color pass through a filter 307B for transmitting the blue color but absorbing the red and green colors. The blue light beam is thereafter incidented on the liquid crystal device 308B for the blue color. The remaining green light beam passes through the dichroic mirrors 306 and further pass through a filter 307G for transmitting the green color but absorbing the red and blue colors. Thereafter, the green light beam is incidented into the liquid crystal device 308G for the green color.

Figure 6:
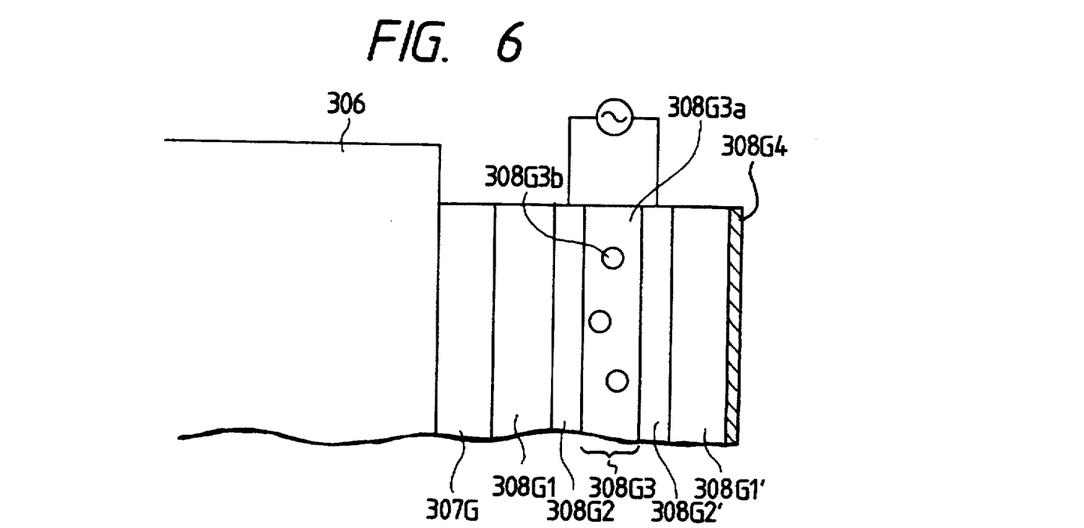
FIG. 6 is a view illustrating a constitution of a liquid crystal device 308G of FIG. 5.

FIG. 6 illustrates a constitution of the liquid crystal device 308G for green color among the light crystal devices classified by three colors. Other liquid crystal devices have the same constitution. The respective liquid crystal devices take, as a matter of fact, a matrix structure in which the pixels are both longitudinally and laterally divided by constant predetermined numbers. Illustrated herein, however, are only the portions needed for explaining the operating principle of the present liquid crystal devices.

A layer 308G3 is interposed between glass substrates 308G1 and 308G1' having internal transparent electrodes 308G2, 308G2'. Injected into the layer 308G3 are a macromolecule medium 308G3a and droplets 308G3b diffused into the macromolecule medium 308G3a consisting of liquid crystal molecules having a positive dielectric anisotropy.

Materials of the macromolecule medium and the liquid crystal molecules are selected so that a refractive index of the macromolecule medium 308G3a is equal to a normal refractive index of the liquid crystal molecules in the droplets 308G3b. A reflection mirror 308G4 consisting of an aluminum metal or the like is formed on the outer surface of the glass substrate 308G1'. The reflection mirror 308G4 has a function to reflect the green light beam incident on the liquid crystal device 308G and return it again to the dichroic mirrors 306.

In the liquid crystal devices of FIG. 6, if no voltage is applied between transparent electrodes 308G2 and 308G2', the liquid crystal molecules in the droplets 308G3b are oriented at random. Hence, a mean refractive index of the droplets 308G3b does not coincide with a refractive index of the macromolecule medium 308G3a, whereby the incident light on the liquid crystal molecules is scattered. Whereas if a voltage is applied, molecular major axes of the liquid crystal molecules having the positive dielectric anisotropy are aligned in the perpendicular direction to the transparent electrode surfaces 308G2 and 308G2'. Therefore, the refractive indices in the direction parallel to the layer 308G3 consisting of the liquid crystal molecules and the macromolecule medium coincide with each other. Therefore, the incident light on the liquid crystal device, which has electric field vectors in the layer directional plane, travels straight without being scattered.

When some pixels of the liquid crystal device explained in FIG. 6 are in the scattered state where no voltage is applied, as indicated by a ray $\beta$ in FIG. 5, a light beam is generated traveling towards another liquid crystal device (the red liquid crystal device 308R herein). The ray $\beta$ is, however, absorbed by the filter 307R, disposed on the incident side of the liquid crystal device 308R, for absorbing the green and blue colors. Hence, a ghost image and flare rays are prevented from being produced without being scattered again in the liquid crystal device 308R. The situation is, it can be said, the same about the other liquid crystal devices.

The advantages of this embodiment are as follows:

1. The generation of the ghost image or the flare rays due to the scattered light beam from the pixels of the respective liquid crystal devices can be prevented. Prevention is achieved by providing a filter which transmits the corresponding color but absorbs the other colors at the light incident side of each color liquid crystal device.

2. The dichroic mirrors intersecting crosswise as shown in FIGS. 4 and 5 are combined with the reflex type liquid crystal device illustrated in FIG. 6. Deterioration of the picture quality can be prevented through the addition of the effect of the above item 1, though the size of apparatus is remarkably smaller than the conventional projector depicted in FIG. 1.

3. In accordance with this embodiment, the light absorbing action is provided with only the filters 307R, 307G, 307B. However, the effect of the item 1. is further enhanced by adding the shield plates or the filters exhibiting the action to absorb the white light or specific color light to any areas other than the area through which not the scattered light but the normal light beam passes.

Next, a second embodiment of the present invention will be described with reference to FIG. 7. Differences from the first embodiment are filters 311R, 311G and 311B.

For instance, the filter 311R placed at the incident side of the red liquid crystal device 308R is composed of a proper optical multi-layer film (exhibiting, e.g., an angular dependency and a wavelength dependency or the like) so that the filter 311R reflects a light beam $\gamma$ scattered from the pixels of the green liquid crystal device 308G but transmits the red light beam $\delta$.

Similarly, other filters 311G and 311B are constituted to reflect the light beam scattered from the other liquid crystal devices but transmit the normal incident light on the corresponding liquid crystal devices 308G and 308B.

The scattered light $\gamma$ from the liquid crystal device 308G is normally reflected by the filter 311R without being scattered, and it follows that an angle to the optical axis of the Schlieren lens 305 does not change. Hence, the ghost image and the flare rays can be prevented without that the light becomes stray light and travels through the aperture part 309b of the shield plate 309a.

Next, a third embodiment of the present invention will be explained with reference to FIG. 8.

Designated by 401R, 401G and 401B are light sources for emitting the red light, the blue light and the green light. The explanation starts with portions associated with the light source 401R for emitting the red light. The light beam emitted from the light source 401R is reflected by a reflector 402R assuming such a configuration as to be a part of the rotational parabolic surface in which a position of focal point coincides with the light source 401R. The light beam passes through a filter 403R for cutting the infrared rays, the ultraviolet rays and unnecessary visible light other than the red light, thereby becoming a parallel light beam of only the red light. The red light incidents into the liquid crystal device 404R. The light beam after passing through the liquid crystal device 404R further passes through a filter 405R which transmits the red color but absorbs the green and blue colors. The liquid crystal device 404R is split into a plurality of pixels arranged in matrix. The respective pixels are respectively independently driven by electric signals corresponding to contents of display and brought into a scattered or transparent state with respect to the incident light beam. A dichroic mirror unit intersecting crosswise consists of: dichroic mirrors 406R1, 406R2 which reflect the red color but transmit the green and blue colors; and dichroic mirrors 406B1, 406B2 which reflect the blue color but transmit the red and green colors. The red light incidents into the dichroic mirror unit and is reflected by the dichroic mirrors 406R1 and 406R2. The light beam passing through the transparent pixels of the liquid crystal device 404R is condensed towards an aperture part of a shield plate 408 through a Schlieren lens 407. The condensed light is projected to form an image on an unillustrated screen by means of a projection lens 409.

On the other hand, the luminous flux, which passes through the pixels, exhibiting the scattering action, of the liquid crystal device 404R, is directed to a shielding part of the shield plate 408 via the Schlieren lens 407. The light beam does not therefore reach the screen.

The light beam from the light source 401G (401B) for emitting the green light (blue light) is, as in the same way with the red color, directed towards the Schlieren lens 407 by undergoing interactions of reflector 402G (402B), the filter 403G (403B) for cutting the unnecessary wavelength light, the liquid crystal device 404G (404B), the filter which transmits the green light (blue light) but absorbs the red and blue colors ( red and green colors) and the dichroic mirrors intersecting crosswise.

The same liquid crystal devices 404R, 404G and 404B corresponding to the respective colors as those employed in the conventional example discussed in FIG. 2 are usable.

Figure 8:
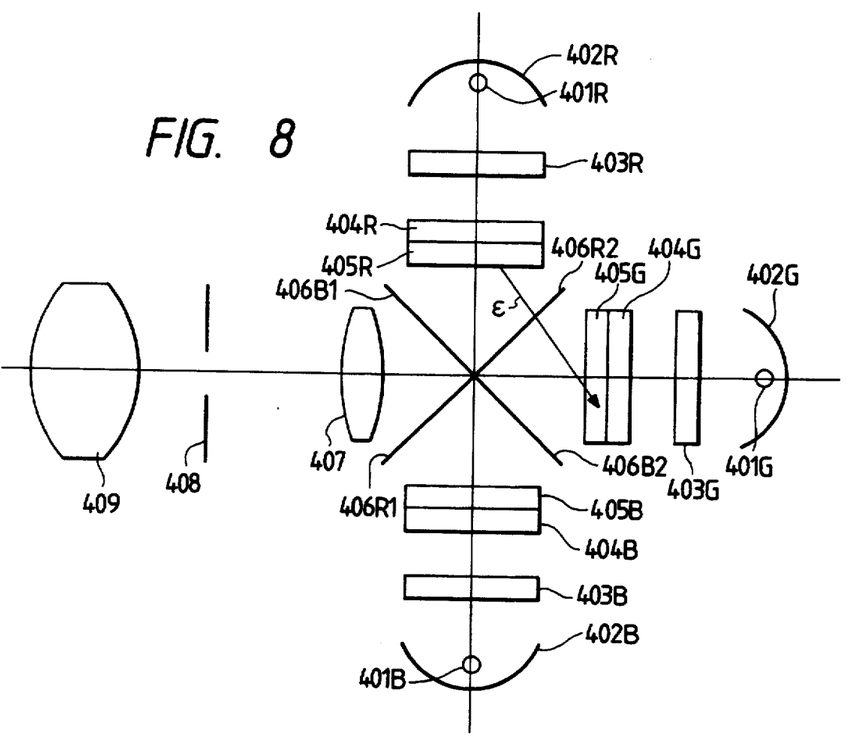
FIG. 8 is a view depicting a constitution of still another embodiment of the present invention.

When some pixels of a liquid crystal device as explained in FIG. 2, e.g., the liquid crystal device 404R for red color are in the scattered state where the voltage is not applied, as indicated by ray ε in FIG. 8, there is generated a light beam traveling towards the other liquid crystal device (the liquid crystal device 404G for green color herein). The dichroic mirror 406R2 originally reflects the red light having an incident angle of 45 degrees, and hence the ray deviating extraordinarily from 45 degrees as in the case of the ray ε penetrates the dichroic mirror 406R2. The ray ε is, however, absorbed by the filter 405G, disposed on the outgoing side of the liquid crystal device 404G, for absorbing the red color. The generation of the ghost image or the flare rays is therefore prevented without being re-scattered by the liquid crystal device 404G. The situation is, it can be said, the same with other liquid crystal devices.

The following are specific effects of these embodiments.

1. The ghost image and the flare rays due to the scattered light beam from the pixels of the respective liquid crystal devices can be prevented by providing the filter which transmits the corresponding color but absorbs the other colors at the light outgoing side of each color liquid crystal device.

2. The dichroic mirrors intersecting crosswise as shown in FIG. 8 are combined with the transmission type liquid crystal device illustrated in FIG. 2 and three light sources for emitting mainly the beams of red, green and blue colors. Deterioration of the picture quality can be prevented through the addition of the effect of the above item 1, though remarkably smaller in terms of a side of apparatus than the conventional projector depicted in FIG. 1.

3. In accordance with this embodiment, the absorptive effect is given to only the filters 405R, 405G and 405B. However, the effect of 1. can be further enhanced by adding the shield plates or the filters exhibiting the action to absorb the white light or specific color light to any areas other than the area through which not the scattered light but the normal light beam pass.

4. The utilizing light beams can be approximately tripled as compared with the conventional ones without changing the electric power consumed for light source by use of the monochromatic light sources of red, green and blue colors. Besides, a size of the light emitting part of each light source is the same as the conventional one. Hence, a divergent angle of the light beams of the parallel light beams outgoing from the reflector does not make larger. Therefore, an efficiency at which the liquid crystal device surface is illuminated with the light does not change. This is contrastive with such a case that the size of the light emitting part has to increase in terms of a life-span of the light source when augmenting the electric power consumption of the light source simply by tripling the consumption in the prior art projector illustrated in FIG. 1.

Next, a further other embodiment will be briefly explained.

Figure 7:
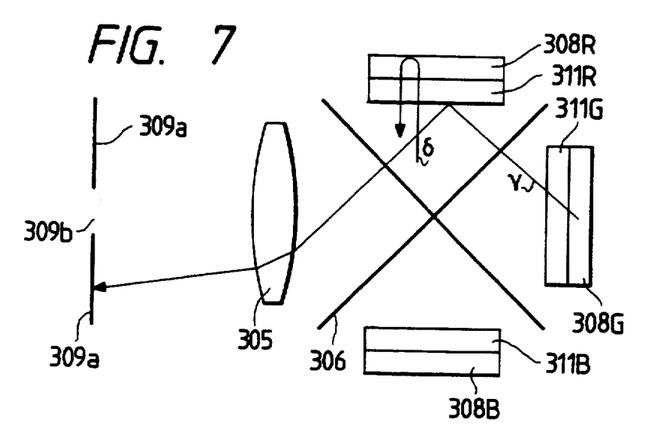
FIG. 7 is a view showing a constitution of another embodiment of the present invention.

The filters 405R, 405G and 405B of the projector described in FIG. 8 can be replaced by the filters 311R, 311G and 311B explained in FIG. 7. In this case, the scattered light ε from a liquid crystal device, e.g., the liquid crystal device 404R for red color is normally reflected by the filter 311G without being scattered. Hence, even through the filter 311B similarly causing no scattered light and the dichroic mirror unit, an angle to the optical axis of the Schlieren lens 407 does not thereafter change as compared with the case where the light is scattered by the liquid crystal device 404R for red color. Therefore, the generation of the ghost image or the flare rays can be prevented without that the light becomes the stray light and travels towards the aperture part of the shield plate 408.

In accordance with a still further embodiment, it is possible to prevent the generation of the ghost image or the flare rays by adding the same absorptive or reflex type filters on the outgoing sides of the liquid crystal devices 107R, 107G and 107B even in the conventional projector depicted in FIG. 1.

The constitution to which the present invention is applicable is not limited to the embodiments discussed above. There can be considered applications to a variety of projectors incorporating a color resolving system and a color synthesizing system that are different in constitution from those in the respective embodiments or having no color synthesizing system or including a plurality of projection lenses for performing the projection, and so on.

In accordance with the respective embodiments, there is no necessity for adding the reflex or absorptive type filters to all the liquid crystal devices. For example, where the present invention is applied to the conventional projector shown in FIG. 1, a sufficiently good image can be obtained by providing the filters employed in the present invention at the light outgoing sides of the liquid crystal devices 107G and 107B. However, among the rays scattered by the liquid crystal device 107G, there exists, though very small, a ray α referred to as a reflective diffusion. Hence, more preferable, the filter used in the present invention is added at the light incident side of the liquid crystal device 107R.

Note that the present invention is not limited to the arrangement in which, as depicted in FIG. 6, the filter 307G is provided adjacently to the glass substrate 308G1. The glass substrate 308G1 may be colored to use a filter according to the present invention. This is also applicable to the liquid crystal devices in the other embodiments.

Further, in the embodiments demonstrated above, there is shown only the light valve consisting of the liquid crystal devices including the droplets of the liquid crystal molecules in the macromolecule medium. The present invention is, however, applicable to an arrangement which involves the use of light valves ranging from the one (GLC, light modulating element, etc.) having a deflection mode such as scattering or diffraction and so on and a light valve wherein the scattered light is produced for some reasons. When using, e.g., a TN type liquid crystal, the flare is caused due to an irregular reflection on a TFT and diffracted light or scattered light by other constituent members within the liquid crystal device in some cases. In this case also, the present invention is effectively applicable.

In the embodiments described above, there are shown the dichroic mirrors as the color resolving optical system and the color synthesizing system. The dichroic mirror connoted herein is not limited to the mirror assuming a parallel flat configuration but may include a mirror taking a prism-like shape.

The present invention exhibits, as a matter of course, effects of preventing not only the light scattered by one light valve from the incidence on the other light valve but also the stray light caused for some reasons within the projector apparatus from the incidence on the light valve.

Figure 9:
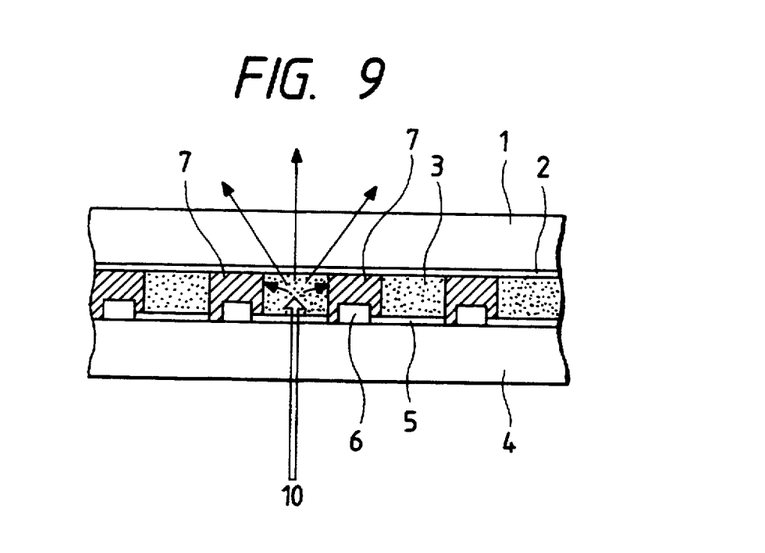
FIG. 9 is a sectional view illustrating a further embodiment of the present invention.

Explained next is an embodiment in which a means for preventing the flare rays is incorporated within the display device. FIG. 9 is a view of a further embodiment of the present invention, illustrating a section of the device. Designated by 7 is a partition, composed of a colored resin or a pigment-diffused resin, for shielding between the pixels. Therefore, as illustrated in the FIG. 9, among the rays of scattered light from a liquid crystal layer 3 within each pixel, the rays traveling sideways are absorbed or reflected by this partition. Consequently, the scattered light does not enter the adjacent pixels, thereby preventing the inter-pixel flare.

Besides, this partition is disposed above a TFT element and a signal line 6, and hence the scattered light does not incident on the TFT element. A photo current flown by light within the TFT element is thereby prevented.

FIGS. 11A to 11E show one example of a manufacturing process of the present device. The explanation will be given hereinbelow in accordance with the numerals in the FIGS.

Figure 11A:
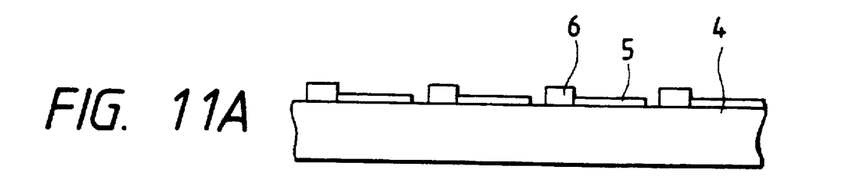
FIGS. 11A to 11E are views of assistance in explaining manufacturing processes in the embodiment of FIG. 9.

FIG. 11A: Formed on a glass substrate 4 is a drive unit including an ITO pixel electrode 5, the TFT element and the signal line 6.

Figure 11B:
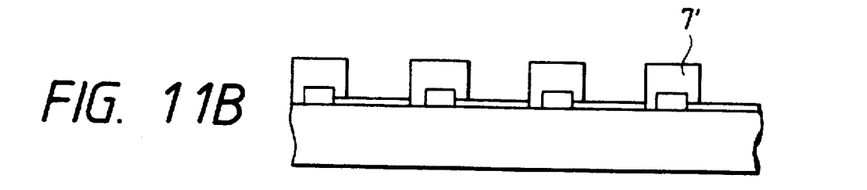

FIG. 11B: Coated thereon are photosensitive substrate resins 7' such as gelatin, casein, glue, polyacrylamide, PVA and so on. Patterning is effected to remove the only substances on the pixel electrodes by a mask exposure and development.

Figure 11C:
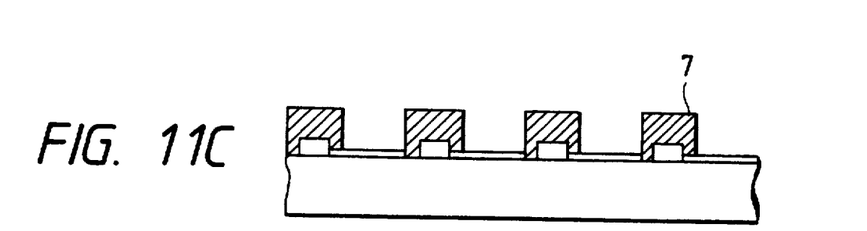

FIG. 11C: This pattern is colored by a black dyestuff and solidified by tannic acid or the like, thereby forming inter-pixel partitions 7.

Figure 11D:
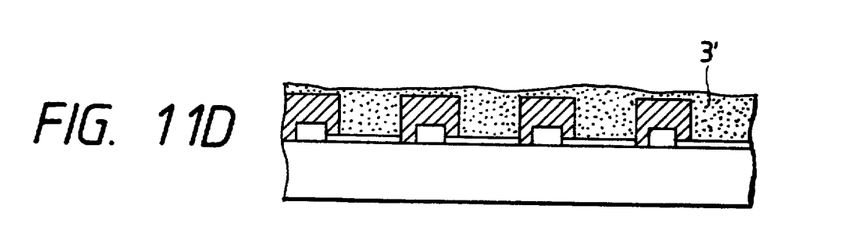

FIG. 11D: Coated thereon is a scattering mode liquid crystal (before hardening) 3' composed of a mixture of a UV hardening resin and nematic liquid crystal.

Figure 11E:
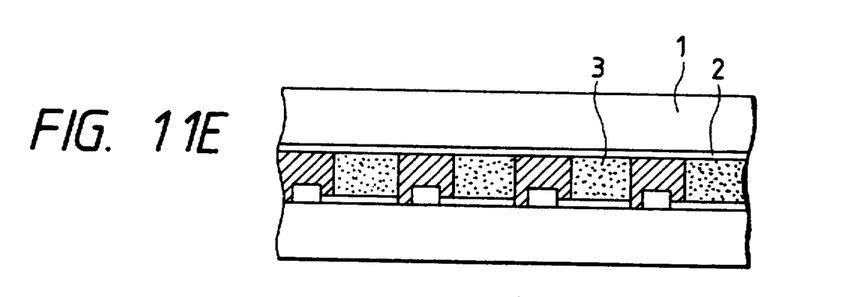

FIG. 11E: Corresponding to this process, the glass substrate 1 formed with a confronting electrode (ITO) 2 is pasted, and tile liquid crystal layer 3 is hardened by UV.

Given further is another method of the process described above as a substitute for the processes of FIGS. 11B and 11C, wherein a colored substrate into which the black pigment is diffused is applied. This may be subjected to patterning by the photolitho method.

Moreover, a white pigment is usable in place of the black pigment. In this case, the flare is prevented because of the inter-pixel portion being shielded by the reflective action of the partition.

Figure 10:
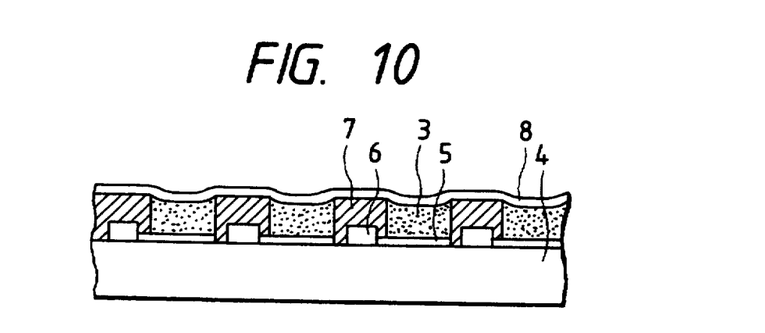
FIG. 10 is a sectional view depicting a still further embodiment of the present invention.

FIG. 10 is a sectional view of the device, showing an additional embodiment. The numeral 8 represents a confronting electrode consisting of ITO. The confronting electrode 8 is so formed as to be deposited directly on the partition 7 and the liquid crystal layer 3. This embodiment, as is similar to the previous embodiment, exhibits the effect of shielding between the pixels and the TFT element by the partition 7. Simultaneously, the device can be manufactured through a much simpler process.

Figure 12A:
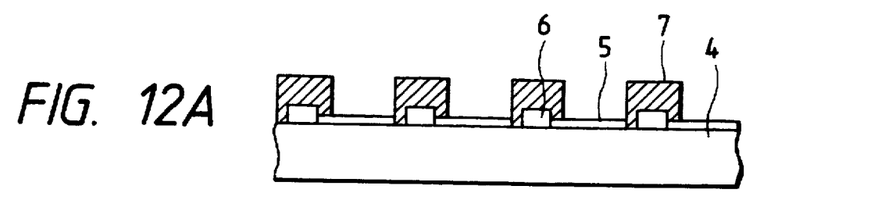
FIGS. 12A to 12C are views for explaining the manufacturing processes in the embodiment of FIG. 10.
Figure 12B:
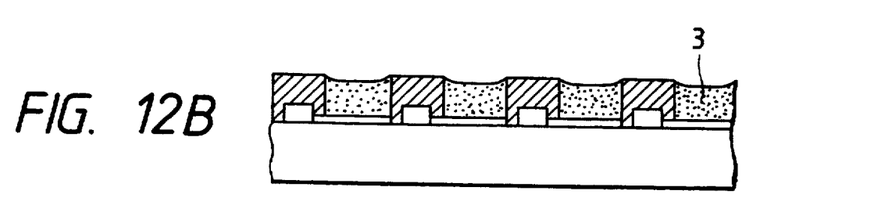
Figure 12C:
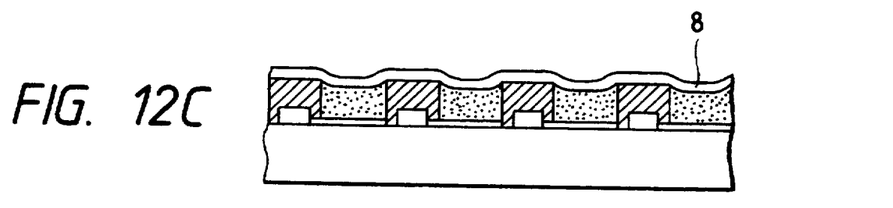

FIGS. 12A to 12C illustrate this process. The following is a description in accordance with the numerals thereof.

FIG. 12A: The partition 7 is subjected to patterning by the processes of FIGS. 11B and 11C in the preceding embodiment on the glass substrate 4 formed with the driving unit such as the TFT element and so on.

FIG. 12B: Coated thereon is the scattering mode liquid crystal composed of a mixture of the UV hardening resin and the nematic liquid crystal. This is UV-hardened and thereby fixed.

FIG. 12C: An ITO film (confronting electrode) 8 is formed thereon by a sputtering method or an EB deposition method.

As discussed above, the shielding partition is interposed between the pixels within the device, particularly above the TFT element and the signal line. Prevented are the inter-pixel flare due to the scattered light from the liquid crystal layer and the photo current in the TFT element. The display image having a high contrast can be obtained.

Further, when the idea of the present invention is applied to the projector, the deflection light from the device is not incident on other devices. It is feasible to prevent the generations of the flare rays and the ghost image caused by the re-deflection. In turn, it is possible to supply the more compact projector capable of the projection display which is brighter but less in the deterioration of the picture quality than the prior arts.

Although the illustrative embodiments of the present invention have been described in detail with reference to the accompanying drawings, it is to be understood that the present invention is not limited to those embodiments. Various changes or modification may be effected by one skilled in the art without departing from the scope or spirit of the invention.

What is claimed is:

1. A projector comprising:
    a first modulating means, said first modulating means having an incident surface to receive and modulate a first light beam, and an outgoing surface through which a first image beam outgoes,
    a second modulating means, said second modulating means having an incident surface to receive and modulate a second light beam, and an outgoing surface through which a second image beam outgoes,
    wherein a member is disposed at an outgoing side of said second modulating means in order to substantially prevent the light beam coming from said first modulating means from being incident on said second modulating means; and
    means for projecting said first image beam and said second image beam.

2. A projector according to claim 1, wherein said first and second modulating means are liquid crystal light valves having a scattering mode or a diffraction mode.

3. The projector according to claim 1, wherein said member is an absorptive or reflection type filter.

4. The projector according to claim 2, wherein said member is an absorptive or reflection type filter and serves as a substrate of said liquid crystal light valve.

5. A projector comprising:
    a white light source for providing a white light;
    three reflection type light valves, corresponding to red, blue and green components of said white light, for forming image light beams of each color,
    wherein a member is disposed at a light incident surface side of one of said light valves in order to substantially prevent the light beam coming from a light value other than said one of said light valves from being incident on said one of said light valves; and a cross dichroic mirror for separating said white light into said red, blue and green components and for combining said image light beams of each color from said three reflection type light valves.

6. A projector according to claim 5, wherein each of said reflection type light valves comprises a liquid crystal valves having a scattering mode or a diffraction mode.

7. A projector comprising:
three color light sources for emitting mainly rays of color light or red, green and blue, respectively;
transmission type light valves, corresponding to said rays of color light of red, blue and green, for forming each color image light; and
a cross-dichroic mirror for synthesizing said rays of color image light outgoing from said respective transmission type light valves;
wherein a member is disposed at an outgoing surface said of one transmission type light valve for absorbing or reflecting the light traveling towards said one transmission type light valve from another transmission type light valve .

8. The projector according to claim 7, wherein said transmission type light values are liquid crystal light valves having a scattering mode or a diffraction mode.

9. A projector comprising:
a white light source for providing a white light;
color separating means for separating said white light into red, blue and green components;
three light modulating means, corresponding to said red, blue and green components, for forming an imaging lights of each color;
color synthesizing means for synthesizing the imaging lights of red, blue and green components; and
projecting means for projecting said synthesized imaging lights,
wherein a member is disposed at an outgoing surface side of any light modulating means among said three light modulating means in order to substantially prevent a light beam coming from a light modulating means other than said any light modulating means from being incident on said any light modulating means.

10. A projector according to claim 9, wherein each of said three light modulating means comprises a liquid crystal light valve having a scattering mode or a diffracting mode.

11. A projector according to claim 9, wherein each of said three modulating means comprises a twist nematic type liquid crystal light valve.

12. A projector comprising:
a first modulating means, said first modulating means having an incident surface to receive a first light beam to make said first light beam scatter or diffract thereon, and an outgoing surface through which a first image beam outgoes,
a second modulating means, said second modulating means having an incident surface to receive a second light beam to make said second light beam scatter or diffract thereon, and an outgoing surface through which a second image beam outgoes;
wherein said second modulating means includes a member for preventing the light beam coming from said first modulating means from being substantially incident on said second modulating means; and
means for projecting said first image beam and said second image beam.

13. A projector according to claim 12, wherein said member is disposed on said incident surface of said second modulating means.

14. A projector according to claim 12, wherein said member is disposed on said outgoing surface of said second modulating means.

15. A projector according to claim 12, wherein said first beam and said second beam having mutually different colors.

16. A projector according to claim 15, wherein said member comprises a color filter.

17. A projector according to claim 16, wherein said member is provided on said outgoing surface in said second modulating means.

18. A projector comprising:
white light source means for providing a white light;
color separating means for separating said white light into red, blue and green components;
three light scattering type modulating means, corresponding to said red, blue and green components, for forming imaging lights of each color components by scattering or diffracting each color components;
color synthesizing means for synthesizing the imaging lights of red, blue and green components; and
means for projecting said synthesized imaging lights of each color components,
wherein a color filter is disposed at one of said three modulating means in order to substantially prevent light coming from the other one of said three modulating means from being incident on said one of said three modulating means.

19. A projector according to claim 18, wherein said color separating means and said color synthesizing means respectively comprise a cross-dichroic mirror.

20. A projecter according to claim 19, wherein said color separating means is operated as said color synthesizing means.

21. A projector according to claim 19, wherein said color filter is disposed on a light outgoing surface of said modulating means.

22. A projector according to claim 19, wherein said three modulating means each includes a liquid crystal light valve.

23. A projector according to claim 19, wherein said three modulating means each includes a light-reflection type light valve.

* * * * *

UNITED STATES PATENT AND TRADEMARK OFFICE
CERTIFICATE OF CORRECTION

PATENT NO. : 5,371,617
DATED : December 6, 1994
INVENTOR(S) : Hideaki Mitsutake, et al It is certified that error appears in the above-indentified patent and that said Letters Patent is hereby corrected as shown below:

Column 1, line 16, please insert -- , -- after the word "lamp";

Column 1, line 17, please insert -- , -- after the number "102";

Column 1, line 25, delete "dichromic" and insert therefor -- dichroic --;

Column 1, line 38, delete "the" after the word "again";

Column 1, line 56, delete the word "art" and insert therefor the word -- part --;

Column 2 line 27, delete the word "Liquid" and insert therefor --liquid --;

UNITED STATES PATENT AND TRADEMARK OFFICE
CERTIFICATE OF CORRECTION

PATENT NO. : 5,371,617
DATED : December 6, 1994
INVENTOR(S) : Hideaki Mitsutake, et al It is certified that error appears in the above-indentified patent and that said Letters Patent is hereby corrected as shown below:

Column 8, line 35, delete "$\alpha$" after the word "ray" and insert therefor -- $\alpha'$ --;

Column 9, line 43, delete "tile" and insert therefor -- the --;

Column 11, Claim 7, line 11, delete the word "or" and insert therefor the word "of";

Column 11, Claim 7, line 19, insert the word "of" between the words "type" and "light";

Column 11, Claim 11, line 49, insert the word "light" between the words "three" and "modulating".

Column 11, line 19, "said" should read --side --.

Signed and Sealed this

Sixteenth Day of May, 1995

Attest:

Attesting Officer

BRUCE LEHMAN
Commissioner of Patents and Trademarks